US011753001B2

(12) United States Patent
Hara et al.

(10) Patent No.: US 11,753,001 B2
(45) Date of Patent: Sep. 12, 2023

(54) PARKING ASSIST SYSTEM

(71) Applicant: HONDA MOTOR CO., LTD., Tokyo (JP)

(72) Inventors: Yuki Hara, Saitama (JP); Miki Tsujino, Saitama (JP); Hiroshi Yamanaka, Saitama (JP); Yuki Nakada, Saitama (JP); Yasushi Shoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 17/109,914

(22) Filed: Dec. 2, 2020

(65) Prior Publication Data

US 2021/0179083 A1 Jun. 17, 2021

(30) Foreign Application Priority Data

Dec. 13, 2019 (JP) ................. 2019-225930

(51) Int. Cl.
| B60W 30/00 | (2006.01) |
| B60W 30/06 | (2006.01) |
| B60W 10/18 | (2012.01) |
| B60W 30/02 | (2012.01) |
| B60W 50/08 | (2020.01) |
| B60W 10/20 | (2006.01) |

(52) U.S. Cl.
CPC ............ *B60W 30/06* (2013.01); *B60W 10/18* (2013.01); *B60W 10/20* (2013.01); *B60W 30/02* (2013.01); *B60W 50/08* (2013.01); *B60W 2554/20* (2020.02)

(58) Field of Classification Search
CPC combination set(s) only.
See application file for complete search history.

(56) References Cited

U.S. PATENT DOCUMENTS

| 2015/0353080 | A1* | 12/2015 | Mukaiyama | ............ E05B 77/54 |
| | | | | 701/23 |
| 2017/0021828 | A1* | 1/2017 | Seo | ........................ B60W 10/10 |

(Continued)

FOREIGN PATENT DOCUMENTS

| JP | 2012140995 A | 7/2012 |
| JP | 2015120403 A | 7/2015 |
| JP | 2019155992 A | 9/2019 |

OTHER PUBLICATIONS

Notice of Reasons for Refusal for Patent Application JP 2019-225930, dated Jul. 27, 2021; 6 pp.

*Primary Examiner* — Adam D Tissot
(74) *Attorney, Agent, or Firm* — Armstrong Teasdale LLP

(57) ABSTRACT

A parking assist system for a vehicle includes a control device configured to control the vehicle to execute an automatic moving process for autonomously moving the vehicle from a current position to a target position. The control device is configured such that, in a case where a parking brake driving condition is satisfied when the control device stops the vehicle during movement to the target position in the automatic moving process and thereafter cancels the automatic moving process without permitting resumption of the movement of the vehicle, the control device switches a shift position of the shift device of the vehicle to a parking position and drives the parking brake device of the vehicle.

1 Claim, 5 Drawing Sheets

(56) References Cited

U.S. PATENT DOCUMENTS

| | | | |
|---|---|---|---|
| 2018/0024559 A1* | 1/2018 | Seo | G08G 1/144 |
| | | | 701/23 |
| 2018/0237016 A1* | 8/2018 | Khafagy | B60T 8/245 |
| 2019/0118801 A1* | 4/2019 | Noh | B60W 30/06 |
| 2019/0276025 A1 | 9/2019 | Asano | |
| 2021/0107463 A1* | 4/2021 | Nakagawa | B60W 30/06 |
| 2021/0323536 A1* | 10/2021 | Chen | B60W 30/06 |
| 2022/0135025 A1* | 5/2022 | Hidaka | B60W 50/0205 |
| | | | 701/26 |

\* cited by examiner

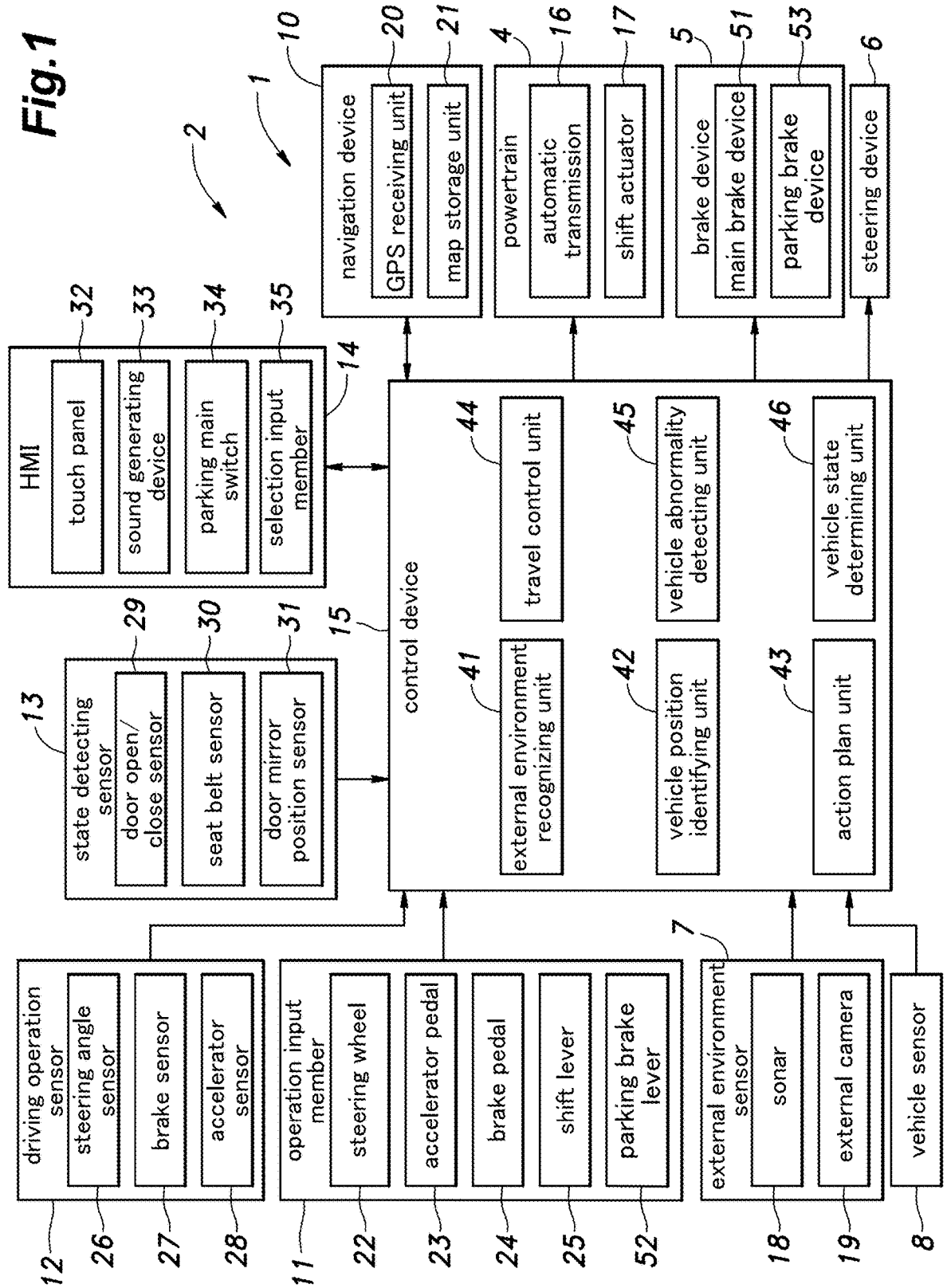

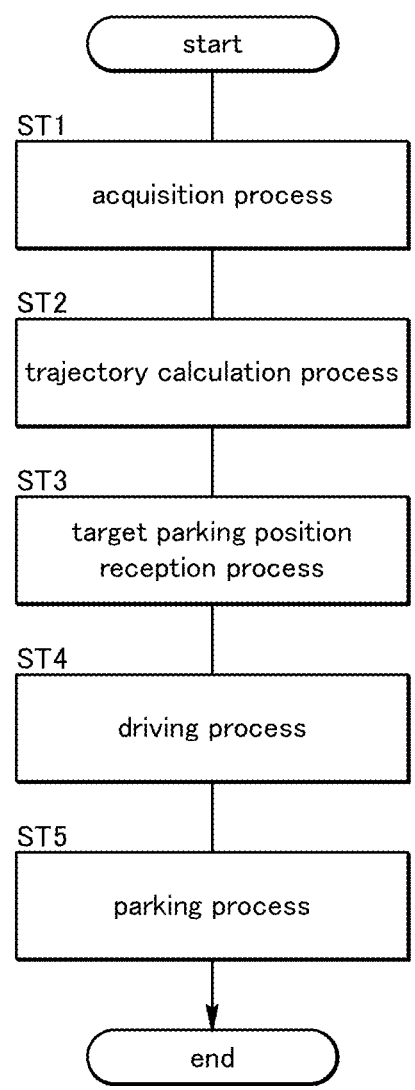

PARKING ASSIST SYSTEM

TECHNICAL FIELD

The present invention relates to a parking assist system that moves a vehicle autonomously from a current position to a target position.

BACKGROUND ART

JP2015-120403A discloses that a shift position of a shift lever is shifted to a parking position at the end of an automatic parking process.

When canceling the automatic parking process in the middle of the trajectory (travel route), it is desired that the transfer of vehicle control (or driving authority) from the parking assist system to the driver is performed safely so that problems such as traveling of the vehicle against the driver's intention are prevented. On the other hand, convenience that enables the driver, to whom the vehicle control is transferred, to perform driving smoothly is also desired.

SUMMARY OF THE INVENTION

In view of such circumstances, an object of the present invention is to provide a parking assist system that can improve the safety in a case where an automatic moving process regarding unparking or parking of the vehicle is canceled before completion. Also, another object of the present invention is to provide a parking assist system that can achieve both safety and the driver' convenience in a case where an automatic moving process regarding unparking or parking of the vehicle is canceled before completion.

One embodiment of the present invention provides a parking assist system (1) for a vehicle including a powertrain (4), a brake device (5), and a steering device (6), the parking assist system comprising: a control device (15) configured to control the vehicle to execute an automatic moving process for autonomously moving the vehicle from a current position to a target position; and an external environment sensor (7) configured to detect an obstacle present around the vehicle, wherein the powertrain includes a transmission (16), the vehicle includes a shift device (25) that can be operated by a driver to operate the transmission, the brake device includes a parking brake device (53), the control device is configured such that, in a case where a parking brake driving condition is satisfied when the control device stops the vehicle during movement to the target position in the automatic moving process and thereafter cancels the automatic moving process without permitting resumption of the movement of the vehicle, the control device switches a shift position of the shift device to a parking position (P) and drives the parking brake device, and the control device is configured to determine that the parking brake driving condition is satisfied when at least one of following conditions is satisfied: (i) the control device stopped the vehicle because the automatic moving process did not end even though a prescribed time period elapsed from a start of the automatic moving process, and (ii) the control device stopped the vehicle because a failure occurred in the parking assist system during execution of the automatic moving process.

According to this configuration, in a case where it is expected that some time is needed for the driver to grasp the cause of the stop of the vehicle and to decide the action to take or in a case where it is expected that the braking force of the main brake consisting of a hydraulic brake may decrease, such as in case of timeout or system failure, the parking assist system switches the shift position to the parking position (P) and drives the parking brake device, whereby the vehicle is doubly fixed in place so that the vehicle is prevented from starting moving against the driver's intention and thus the safety is improved.

In the above configuration, preferably, the control device is configured such that, in a case where a parking brake non-driving condition is satisfied when the control device stops the vehicle during the movement to the target position in the automatic moving process and thereafter cancels the automatic moving process without permitting resumption of the movement of the vehicle, the control device switches the shift position of the shift device to the parking position (P) but does not drive the parking brake device, and the control device is configured to determine that the parking brake non-driving condition is satisfied when at least one of following conditions is satisfied: (i) the control device stopped the vehicle according to an operation of the shift device by the driver; (ii) the driver operated the shift device during a period from when an event that necessitated stop of the vehicle occurred to when the vehicle was stopped; (iii) the shift position of the shift device is a neutral position (N) at the time when the vehicle was stopped; (iv) the control device stopped the vehicle because the external environment sensor detected an obstacle that may collide with the vehicle, and the obstacle is not removed within a prescribed time period from detection of the obstacle or stop of the vehicle; (v) the vehicle is equipped with a vehicle stability assist system and the control device stopped the vehicle according to an operation of the vehicle stability assist system; and (vi) the parking assist system is temporarily inoperable.

According to this configuration, when the parking brake non-driving condition is satisfied, the shift position of the shift device is switched to the parking position (P) but the parking brake device is not driven, whereby both safety and the driver's convenience can be achieved.

In the above configuration, preferably, the parking assist system is configured to enable the driver to preset a parking brake setting which determines whether to drive the parking brake device in a case where the shift position is switched to the parking position (P) by the control device at an end of the automatic moving process, and the control device is configured to prioritize control to be performed when the parking brake driving condition is satisfied than control to be performed according to the parking brake setting, and to prioritize control to be performed when the parking brake non-driving condition is satisfied than control to be performed according to the parking brake setting.

According to this configuration, when the automatic moving process is canceled, the driving/non-driving of the parking brake device is determined basically according to the setting made by the driver, but as an exception, in the case where the parking brake driving condition in which the safety is important is satisfied and in the case where the parking brake non-driving condition in which the convenience is important is satisfied, the control to be performed when the respective conditions are met is prioritized, whereby both safety and the driver's convenience can be achieved.

According to the present invention, it is possible to provide a parking assist system that can improve the safety in a case where an automatic moving process regarding unparking or parking of the vehicle is canceled before completion.

BRIEF DESCRIPTION OF THE DRAWINGS

FIG. 1 is a functional block diagram of a vehicle provided with a parking assist system according to an embodiment of the present invention;

FIG. 2 is a flow chart of an automatic parking process in the parking assist system according to the embodiment;

DESCRIPTION OF THE PREFERRED EMBODIMENT(S)

Figure 3A:
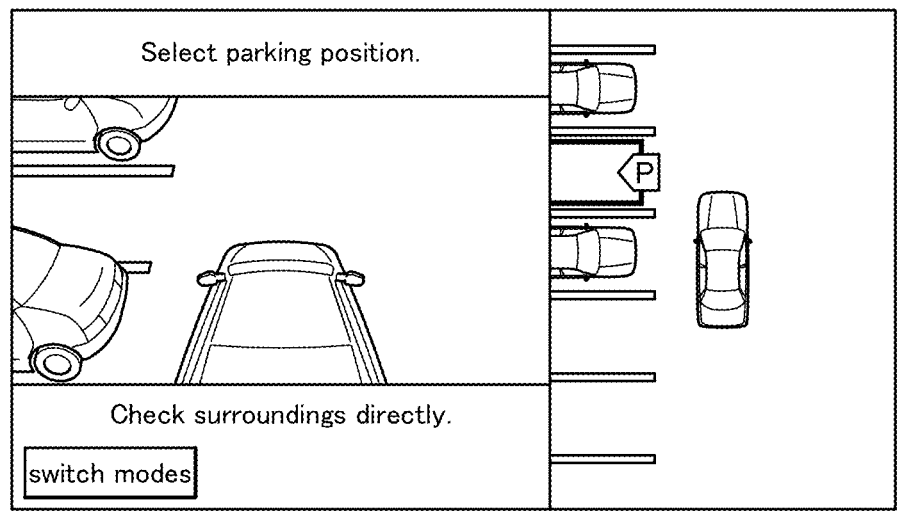
FIG. 3A is a diagram showing a screen display of a touch panel during a target parking position reception process in the parking assist system according to the embodiment.

In the following, an embodiment of the present invention will be described in detail with reference to the drawings.

A parking assist system 1 is mounted on a vehicle such as an automobile provided with a vehicle control system 2 configured to make the vehicle travel autonomously.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device 53 configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the control device 15, the brake pedal 24 as a brake input member, the driving operation sensor 12, and the state detecting sensor 13.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

In the present embodiment, the vehicle abnormality detecting unit 45 can detect an abnormality in the screen display of the touch panel 32 based on at least a signal from the touch panel 32.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

Also, when it is determined, based on the detection result of the state detecting sensor 13, that the door is opened and the seat belt is released, the vehicle state determining unit 46 determines that the alighting intention of the occupant is certain and that the vehicle is in a cancellation state in which the autonomous movement (namely, the autonomous parking operation or the autonomous unparking operation) of the vehicle should be canceled. In addition, the vehicle state determining unit 46 may determine that the vehicle is in the cancellation state when there is an input to a cancellation button displayed on the touch panel 32 while the vehicle is moving autonomously.

In the present embodiment, each vehicle seat provided in the vehicle cabin is provided with a seating sensor configured to detect seating of the occupant. The vehicle state determining unit 46 determines a seating position of the occupant (namely, the vehicle state determining unit 46 identifies the vehicle seat on which the occupant is seated) based on a signal from the seating sensor, and determines that the vehicle is in the cancellation state when the seat belt at the seating position is released and the door near the seating position is opened.

As described above, the driving operation sensor 12 and the state detecting sensor 13 each correspond to the vehicle state detecting device configured to detect the state of the vehicle (for example, the prohibition state in which the autonomous parking operation or the autonomous unparking operation of the vehicle should be prohibited). The vehicle state determining unit 46 determines the state of the vehicle based on the detection results of the driving operation sensor 12 and the state detecting sensor 13. By using the driving operation sensor 12, it is possible to easily detect the override operation of the occupant. By using the state detecting sensor 13, it is possible to easily detect an alighting operation of the user and a change in the state of the vehicle according to an extending/retracting operation of the door mirror.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
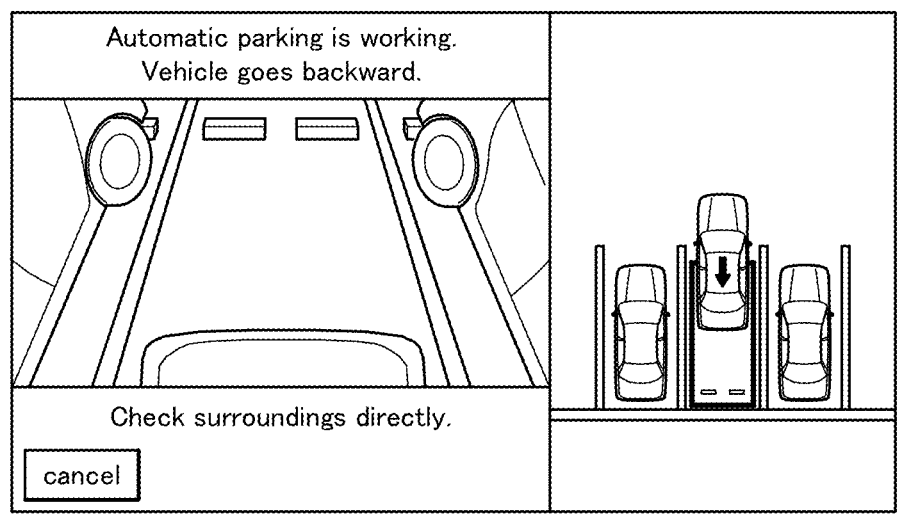
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
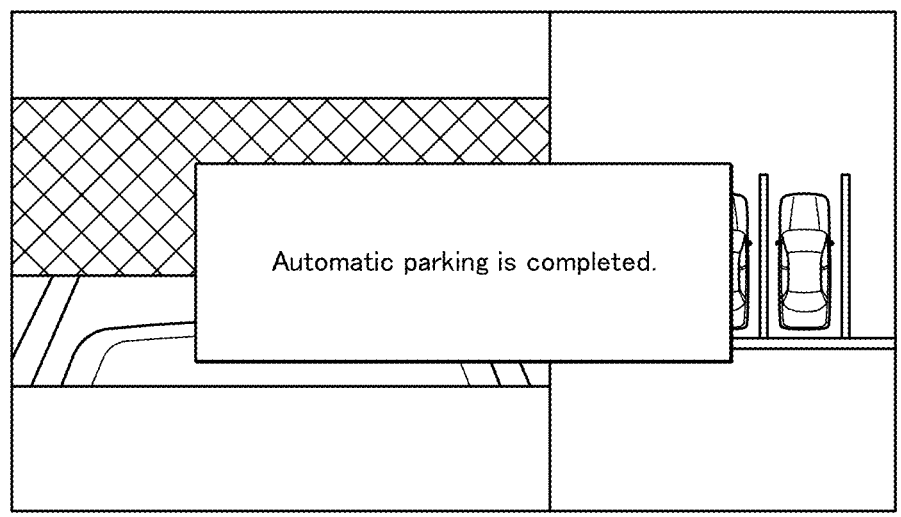
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device 53, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device 53 cannot be driven because of an abnormality of the parking brake device 53. In these cases, the action plan unit 43 may make the touch panel 32 display the cause of the abnormality on the screen thereof.

Figure 4:
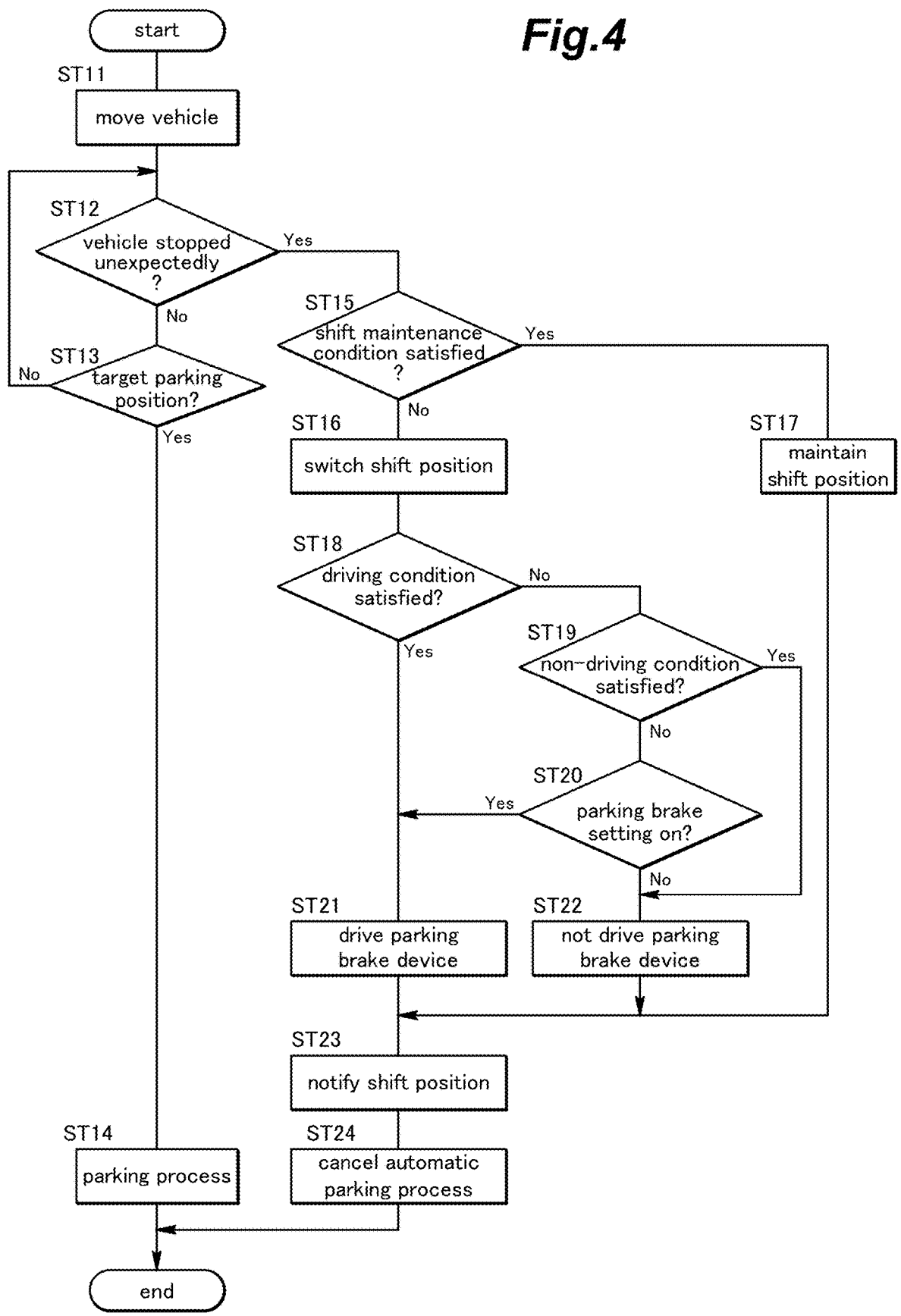
FIG. 4 is a flow chart showing details of the automatic parking process in the parking assist system according to the embodiment.
Figure 5:
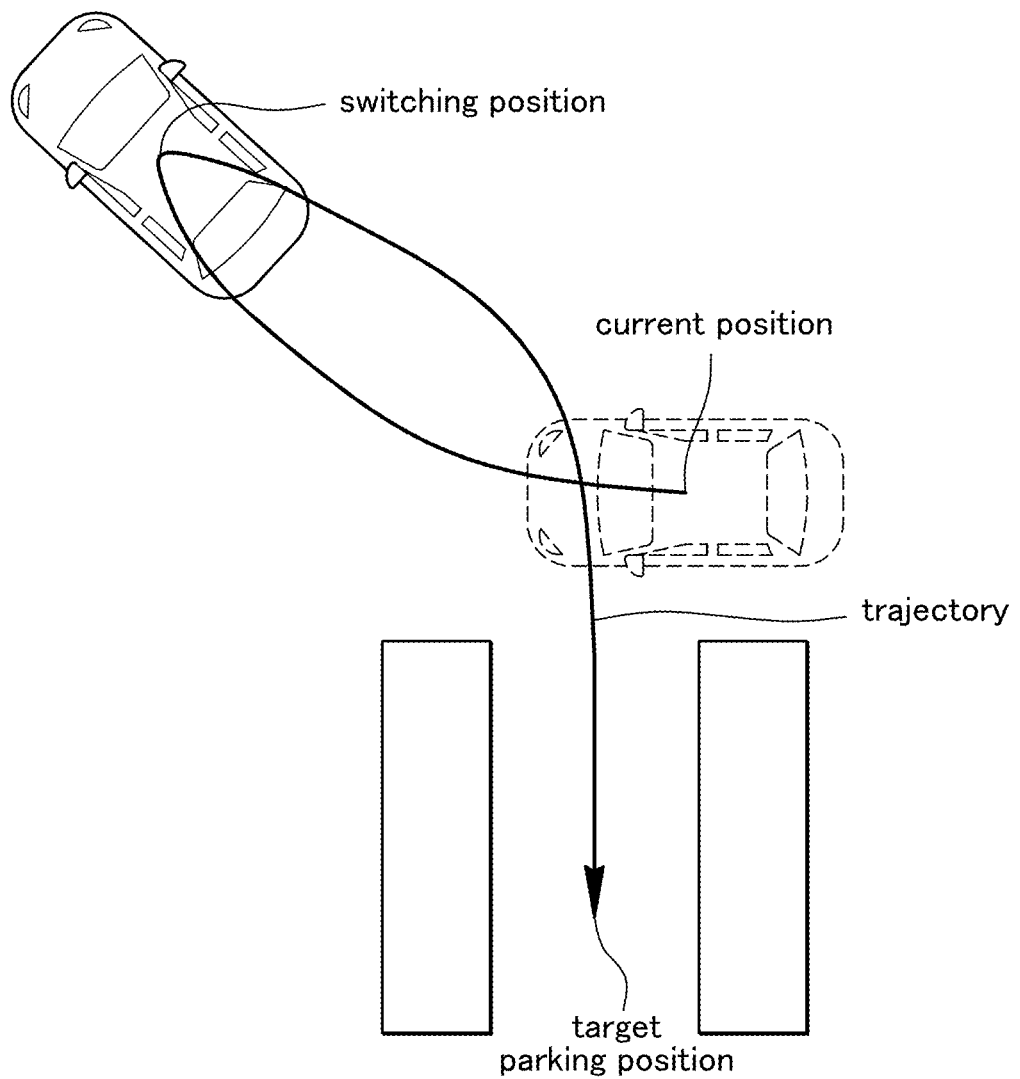
FIG. 5 is a plan view showing a trajectory of the vehicle during the automatic parking process in the parking assist system according to the embodiment.

Next, with reference to FIGS. 1, 4, and 5, the details of the automatic parking process will be described with regard to a case where the vehicle is stopped during the automatic parking process. In the following, the automatic parking process to move the vehicle from the current position to the target parking position will be described as an example of an automatic movement process. However, the present invention can be applied to the automatic unparking process to move the vehicle from the current position to the target unparking position in the vicinity thereof. Incidentally, the brake device 5 includes a main brake device 51 (regularly used brake device) and the above electric parking brake device 53. The main brake device 51 is configured to be driven according to pressing of the brake pedal 24 by the driver so as to apply the brake force to the vehicle. The parking brake device 53 is configured to be driven according to a pull of a parking brake lever 52 (an example of the operation input member 11) by the driver so as to apply the brake force to the vehicle. That is, the brake device 5 (the main brake device 51 and/or the parking brake device 53) is driven so as to apply the brake force to the vehicle, which will be simply referred to as "the brake device 5 is driven". The control device 15 can drive the main brake device 51 and the parking brake device 53.

In the present embodiment, the action plan unit 43 of the control device 15 calculates the trajectory (movement route) of the vehicle such that the vehicle moves forward from the current position to a switching position, then stops at the switching position, then moves backward from the switching position to the target parking position, and then stops at the target parking position (see step ST2 in FIG. 2). First, the travel control unit 44 of the control device 15 moves the vehicle forward along the trajectory at a normal movement speed (step ST11). While moving the vehicle in this way, the control device 15 determines whether the vehicle is stopped unexpectedly (step ST12). In a case where the vehicle is stopped at the switching position, the determination in step ST12 becomes "No", since the vehicle is stopped expectedly. In such a case, the control device 15 switches the shift position of the shift lever 25 and/or the automatic transmission 16 (hereinafter simply referred to as "the shift position") from "D" (driving position) to "R" (reverse position) after the vehicle is stopped at the switching position, and continues to move the vehicle according to the automatic parking process. Thereafter, the control device 15 determines whether the vehicle has reached the target parking position (step ST13). In a case where the control device 15 determines that the vehicle has not reached the target parking position (No in step ST13), the control device 15 returns to step ST12. In a case where the control device 15 determines that the vehicle has reached the target parking position (Yes in step ST13), the control device 15 stops the vehicle, executes the parking process (step ST14; see step ST5 in FIG. 2), and ends the automatic parking process.

For example, in a case where the external environment sensor 7 detects an obstacle that may collide with the vehicle or in a case where the driver presses the brake pedal 24 (namely, in a case where the driver performs a brake operation), the vehicle may be stopped at a position other than the switching position. In these cases, the control device 15 determines that the vehicle is stopped unexpectedly during the automatic parking process (Yes in step ST12), and then determines whether a prescribed shift maintenance condition is satisfied (step ST15). In a case where the control device 15 determines that the shift maintenance condition is not satisfied (No in step ST15), the action plan unit 43 of the control device 15 switches the shift position to "P" (parking position) (step ST16). That is, in a case where the control device 15 determines that the vehicle is stopped unexpectedly, the action plan unit 43 generally switches the shift position to "P". In a case where the control device 15 determines that the shift maintenance condition is satisfied (Yes in step ST15), the action plan unit 43 maintains the shift position (step ST17). That is, in a case where the control device 15 determines that the vehicle is stopped unexpectedly, the action plan unit 43 exceptionally maintains the shift position.

The shift maintenance condition includes the following conditions (i)-(iii). The condition (i) is a condition that the vehicle is stopped at a position out of a prescribed range before the switching position and the vehicle is stopped according to the pressing of the brake pedal 24 (the operation of the brake input member) by the driver. The condition (ii) is a condition that a cause for which the vehicle has been stopped is removed within a prescribed period from occurrence of the cause or a stop of the vehicle. The condition (iii) is a condition that the travel control unit 44 stops the vehicle according to the operation of the steering wheel 22 by the driver. On the other hand, the shift maintenance condition does not include the following conditions (iv) and (v). The condition (iv) is a condition that the vehicle is stopped within the prescribed range before the switching position and the vehicle is stopped according to the pressing of the brake pedal 24 by the driver. The condition (v) is a condition that the vehicle is stopped due to the abnormality of the parking assist system 1. Thus, even if the condition (iv) or the condition (v) is satisfied, the action plan unit 43 switches the shift position to "P".

The control device 15 recognizes the position of the vehicle with respect to the trajectory including the switching position based on the information from a vehicle position detecting device that includes the external environment sensor 7, the navigation device 10, and/or an odometer. The above "prescribed range before the switching position" means a range within a prescribed distance (for example, 1 m to 3 m) from the switching position when the vehicle is approaching the switching position, and does not mean a range within the prescribed distance from the switching position when the vehicle is moving away from the switching position.

The above condition (ii) includes the following conditions (ii-1) and (ii-2). The condition (ii-1) is a condition that the vehicle is stopped according to the pressing of the brake pedal 24 by the driver and the pressing of the brake pedal 24 by the driver is released or loosened within the prescribed period. The condition (ii-2) is a condition that the travel control unit 44 stops the vehicle according to the detection of the obstacle by the external environment sensor 7 in a collision possible area (an area where the collision between the vehicle and the obstacle is possible) and the action plan unit 43 determines that the obstacle moves out of the collision possible area within the prescribed period based on the information from the external environment sensor 7.

Incidentally, the case where the vehicle is stopped according to the pressing of the brake pedal 24 by the driver includes the following cases (1) and (2). The case (1) is a case where the control device 15 determines that the driver has pressed the brake pedal 24 (the driver has performed an override operation to the brake pedal 24) based on the information from the brake sensor 27 and thereby drives the main brake device 51 so as to stop the vehicle. The case (2) is a case where the main brake device 51 is directly driven according to the pressing of the brake pedal 24 and thereby the vehicle is stopped.

After the action plan unit 43 switches the shift position to "P" (step ST16), the control device 15 determines whether a driving condition is satisfied (step ST18). In a case where the control device 15 determines that the driving condition is not satisfied (No in step ST18), the control device 15 determines whether a non-driving condition is satisfied (step ST19). In a case where the control device 15 determines that the non-driving condition is not satisfied (No in step ST19), the control device 15 determines whether a parking brake setting is switched on (step ST20). In the parking assist system 1 of the present embodiment, when the vehicle is stopped during the automatic parking process and the action plan unit 43 switches the shift position to "P", the control device 15 determines whether to drive the parking brake device 53 according to the parking brake setting (step ST20), which can be set by the driver beforehand. Further, in the parking assist system 1 of the present embodiment, the driving condition (step ST18) is provided for forcibly driving the parking brake device 53 regardless of the parking brake setting, and the non-driving condition (step ST19) is provided for forcibly not driving the parking brake device 53 regardless of the parking brake setting. When the shift position is switched to "P", the action plan unit 43 further determines whether to drive the parking brake device 53 (step ST18 to step ST20). Incidentally, the driving condition and the non-driving condition are not included in the shift maintenance condition. In a case where the driving condition or the non-driving condition is satisfied, the action plan unit 43 switches the shift position to "P" (step ST16).

In a case where the driving condition is satisfied (Yes in step ST18), or in a case where the non-driving condition is not satisfied (No in step ST19) and the parking brake setting is switched on (Yes in step ST20), the action plan unit 43 pulls the parking brake lever 52 so as to drive the parking brake device 53 (step ST21). In a case where the non-driving condition is satisfied (Yes in step ST19) or in a case where the driving condition is not satisfied (No in step ST18) and the parking brake setting is switched off (No in step ST20), the action plan unit 43 does not drive the parking brake device 53 (step ST22). Incidentally, even in a case where the action plan unit 43 does not drive the parking brake device 53, the parking brake device 53 can be driven when the driver pulls the parking brake lever 52.

The driving condition includes the following conditions (A) and (B). The condition (A) is a condition that the automatic parking process does not end even after a prescribed period (for example, 10 minutes) has elapsed from the start of the automatic parking process and thereby the travel control unit 44 stops the vehicle. The condition (B) is a condition that the parking assist system 1 fails during the automatic parking process and thereby the travel control unit 44 stops the vehicle. The condition (B) is satisfied in a case where the automatic parking process cannot be executed safely due to the abnormality of the parking assist system 1. For example, the condition (B) is satisfied in a case where the parking assist system 1 cannot detect the obstacle due to the abnormality of the external environment sensor 7 or the parking assist system 1 cannot transmit the information to the driver due to the abnormality of the touch panel 32.

The non-driving condition includes the following conditions (a)-(f). The condition (a) is a condition that the travel control unit 44 stops the vehicle according to the operation of the shift lever 25 by the driver. The condition (b) is a condition that the driver operates the shift lever 25 after the event to stop the vehicle happens and before the vehicle is stopped. The condition (c) is a condition that the shift position is set to "N" (neutral position) when the vehicle is stopped. The condition (d) is a condition that the travel control unit 44 stops the vehicle according to the detection of the obstacle by the external environment sensor 7 in the collision possible area and the obstacle is not removed within the prescribed period from the detection of the obstacle or the stop of the vehicle. For example, the condition (d) is satisfied when an automatic emergency braking system (AEB system) is driven. The condition (e) is a condition that the travel control unit 44 stops the vehicle according to the operation of a vehicle stability assist system (VSA system). The condition (f) is a condition that the parking assist system 1 is temporarily inoperable.

The above vehicle stability assist system includes an anti-lock braking system (ABS) for preventing the wheels from locking and a traction control system (TCS) for preventing the wheels from spinning, and controls a sideslip (turn) of the vehicle so as to ensure the stability of the vehicle in all areas of "travels, turns, and stops". For example, the vehicle stability assist system may be operated during the automatic parking process in a case where traction control is executed when the driving wheels spin or in a case where the anti-lock braking system is operated when the wheels lock while the vehicle is braking. The parking assist system 1 may become temporarily inoperable in a case where a device such as the brake device 5 or a sensor such as the external environment sensor 7 cannot continue operation or receive the request for operation from the control device 15 even though the abnormality thereof is not surely detected. For example, the parking assist system 1 may become temporarily inoperable in a case where the above device or sensor is shut down and then restarted during the automatic parking process due to some abnormality in the power supply.

When step ST17, step ST21, or step ST22 is completed, the action plan unit 43 makes the output device such as the touch panel 32 or the sound generating device 33 notify the shift position (step ST23). That is, the action plan unit 43 makes the output device notify the shift position regardless of whether the shift position is switched to "P" or maintained. Specifically, the action plan unit 43 makes the touch panel 32 display the shift position and/or makes the sound generating device 33 such as a speaker notify the shift position by a voice. In addition, the action plan unit 43 may also make the output device notify the reason why the vehicle has been stopped. Thereafter, when the driver presses the brake pedal 24 so as to drive the main brake device 51, the control device 15 cancels the automatic parking process (step ST24) and gives the driving authority of the vehicle to the driver.

In the following, the effect of such processes will be described.

In a case where the driver judges that the vehicle has already reached a position suitable for switching the travel direction of the vehicle (hereinafter referred to as "the former case") or in a case where the driver finds the obstacle (hereinafter referred to as "the latter case"), the driver may press the brake pedal 24 (namely, the driver may perform the brake operation) within the prescribed range before the switching position during the automatic parking process. The driver who has been given the driving authority of the vehicle may intend to reverse the travel direction of the vehicle in the former case, and may intend to move the vehicle further in the same direction as before after the obstacle disappears and then switch the travel direction of the vehicle in the latter case. Immediately after the driving authority of the vehicle is given to the driver, the driver may mistakenly think that the shift position corresponds to the direction in which the driver intends to move the vehicle. Particularly, in the former case, the vehicle may move in the direction opposite to the driver's intention immediately after the start of the manual driving in a case where the shift position is maintained as before. In addition, in a case where the vehicle is stopped due to the detection of the obstacle and thereafter the automatic parking process is canceled and the driving authority of the vehicle is given to the driver since the obstacle does not move, the driver may intend to move the vehicle in a direction opposite to the travel direction of the vehicle as before in order to avoid the obstacle, regardless of the position at which the vehicle has been stopped. Even in such a case, the actual travel direction of the vehicle according to the shift position and the travel direction of the vehicle estimated by the driver may become opposite to each other. Also, after the vehicle has been stopped, the control device 15 may be able to calculate a new trajectory (travel path) that can move the vehicle to the target parking position while avoiding the obstacle. In such a case, the control device 15 may resume the automatic parking process according to the new trajectory and switches the shift position. Otherwise, the control device 15 may cancel the automatic parking process. Such many situations make it difficult for the driver to grasp the shift position. Thereby, the control device 15 generally switches the shift position to "P" so as to request the driver to operate the shift lever 25 at the start of manual driving. Thus, it is possible to prevent the vehicle from moving in the direction opposite to the driver's intention. Also, in a case where the parking assist system 1 has the abnormality, the control device 15 switches the shift position to "P". Thus, it is possible to prevent the vehicle from starting inadvertently and thereby to improve the safety around the vehicle.

On the other hand, in a case where it is probable that the actual travel direction of the vehicle according to the shift position and the travel direction of the vehicle estimated by the driver correspond to each other, the parking assist system 1 exceptionally maintains the shift position, so that the convenience of the driver is improved. In a case where the condition (i) included in the shift maintenance condition is satisfied, namely, in a case where the vehicle is stopped at the position out of the prescribed range before the switching position and the vehicle is stopped according to the pressing of the brake pedal 24 by the driver, the vehicle is sufficiently far from the switching position. Thus, it is not probable that the driver judges that the vehicle has reached the switching position, but it is probable that the driver intends to move the vehicle in the same direction as before immediately after the vehicle is switched to the manual driving. Thus, the convenience of the driver can be improved by not changing the shift position.

In a case where the condition (ii-1) as an example of the condition (ii) included in the shift maintenance condition is satisfied, namely, in a case where the vehicle is stopped according to the pressing of the brake pedal 24 by the driver and the pressing of the brake pedal 24 by the driver is released or loosened within the prescribed period, it is probable that the driver finds the obstacle that may collide with the vehicle but the possibility of a collision disappears in a short period. In such a case, the driver possibly intends to move the vehicle in the same direction as before. Thus, the convenience of the driver can be improved by not changing the shift position. Also, in a case where the condition (ii-2) as another example of the condition (ii) included in the shift maintenance condition is satisfied, namely, in a case where the travel control unit 44 stops the vehicle according to the detection of the obstacle by the external environment sensor 7 in the collision possible area and the action plan unit 43 determines that the obstacle moves out of the collision possible area within the prescribed period based on the information from the external environment sensor 7, it is probable that the driver finds the obstacle that may collide with the vehicle but the possibility of a collision disappears in a short period. In such a case, the driver possibly intends to move the vehicle in the same direction as before. Thus, the convenience of the driver can be improved by not changing the shift position.

In a case where the condition (iii) included in the shift maintenance condition is satisfied, namely, in a case where the travel control unit 44 stops the vehicle according to the operation of the steering wheel 22 by the driver, the driver may not intend to switch the travel direction of the vehicle between the forward direction and the backward direction since the operation of the steering wheel 22 is performed for changing the steering angle of the vehicle. Accordingly, the driver possibly intends to move the vehicle in the same direction as before immediately after the vehicle is switched to the manual driving. Thus, the convenience of the driver can be improved by not changing the shift position.

In a case where the condition (B) included in the driving condition is satisfied, namely, in a case where the parking assist system 1 fails during the automatic parking process and thereby the travel control unit 44 stops the vehicle, the driver probably needs a little time to understand that the vehicle has been stopped due to the failure of the parking assist system 1 and then to decide the next action. Thus, the parking assist system 1 not only sets the shift position to "P" but also drives the parking brake device 53, so that the vehicle can be securely fixed and thereby the safety around the vehicle can be improved.

In a case where the condition (A) included in the driving condition is satisfied, namely, in a case where the automatic parking process does not end even after the prescribed period has elapsed from the start of the automatic parking process and thereby the travel control unit 44 stops the vehicle, it is probable that the vehicle cannot be moved to the target parking position due to the existence of the obstacle or that the driver continues to press the brake pedal 24 for a long time. In the former case, the driver probably needs a little time to understand the cause for the stop of the vehicle and then to decide the next action. Thus, the parking assist system 1 not only sets the shift position to "P" but also drives the parking brake device 53, so that the vehicle can be securely fixed and thereby the safety around the vehicle can be improved. In the latter case, the parking assist system 1 not only sets the shift position to "P" but also drives the parking brake device 53, so that the vehicle can be securely fixed even if the driver falls into an unexpected situation. Further, in a case where the main brake device 51 is a hydraulic brake device, the vehicle can be securely fixed even if the hydraulic pressure of the main brake device 51 decreases due to continuous use, so that the main brake device 51 can be protected.

In a case where the non-driving condition is satisfied, the driver possibly starts the driving operation of the vehicle earlier than in a case where the driving condition is satisfied, even though the actual travel direction of the vehicle according to the shift position and the travel direction of the vehicle estimated by the driver may become opposite to each other.

Thus, the control device 15 makes the above two travel directions correspond to each other by requesting the driver to operate the shift lever 25. In addition, the convenience of the driver can be improved by not requiring the driver to operate the parking brake lever 52.

The safety around the vehicle should be emphasized in a case where the driving condition is satisfied, and the convenience of the driver should be emphasized in a case where the non-driving condition is satisfied. When the driving condition or the non-driving condition is satisfied, the control according to the driving condition or the non-driving condition takes priority over the control according to the parking brake setting preset by the driver, so that the safety around the vehicle or the convenience of the driver can be improved.

Further, regardless of whether the shift position is switched or maintained, the output device notifies the shift position, so that the convenience of the driver can be improved.

Concrete embodiments of the present invention have been described in the foregoing, but the present invention should not be limited by the foregoing embodiments and various modifications and alterations are possible within the scope of the present invention. In other embodiments, the shift device may not be the shift lever 25 (namely, the shift device may be formed in a shape other than a lever). In other embodiments, the action plan unit 43 may switch the shift position to "N" (neutral position) instead of switching the shift position to "P" (parking position). In other embodiments, the parking assist system 1 may not cancel but resume the automatic parking process even if the vehicle is stopped unexpectedly. In such a case, the action plan unit 43 may make the touch panel 32 display a cancellation button and a resumption button so that the driver can select whether to cancel or resume the automatic parking process.

The invention claimed is:

1. A parking assist system for a vehicle including a powertrain, a brake device, and a steering device, the parking assist system comprising:
    a control device configured to control the vehicle to execute an automatic moving process for autonomously moving the vehicle from a current position to a target position; and
    an external environment sensor configured to detect an obstacle present around the vehicle,
    wherein the powertrain includes a transmission,
    the vehicle includes a shift device that can be operated by a driver to operate the transmission,
    the brake device includes a parking brake device,
    the control device is configured such that, in a case where a driving condition is satisfied when the control device stops the vehicle during movement to the target position in the automatic moving process and thereafter cancels the automatic moving process without permitting resumption of the movement of the vehicle, the control device switches a shift position of the shift device to a parking position and applies the parking brake device, and
    the control device is configured to determine that the driving condition is satisfied when at least one of following conditions is satisfied: (i) the control device stopped the vehicle because the automatic moving process did not end even though a prescribed time period elapsed from a start of the automatic moving process, and (ii) the control device stopped the vehicle because a failure occurred in the parking assist system during execution of the automatic moving process,
    wherein the control device is configured such that, in a case where a non-driving condition is satisfied when the control device stops the vehicle during the movement to the target position in the automatic moving process and thereafter cancels the automatic moving process without permitting resumption of the movement of the vehicle, the control device switches the shift position of the shift device to the parking position but does not apply the parking brake device regardless of whether a parking brake setting set beforehand by the driver is turned on,
    the control device is configured such that, in a case where the non-driving condition is not satisfied when the control device stops the vehicle during the movement to the target position in the automatic moving process and thereafter cancels the automatic moving process without permitting resumption of the movement of the vehicle, the control device switches on/off the parking brake device depending on whether the parking brake setting is turned on, and
    the control device is configured to determine that the non-driving condition is satisfied when at least one of following conditions is satisfied: (i) the control device stopped the vehicle according to an operation of the shift device by the driver; (ii) the driver operated the shift device during a period from when an event that necessitated stop of the vehicle occurred to when the vehicle was stopped; (iii) the shift position of the shift device is a neutral position at a time when the vehicle was stopped; (iv) the control device stopped the vehicle because the external environment sensor detected an obstacle that may collide with the vehicle, and the obstacle is not removed within a prescribed time period from detection of the obstacle or stop of the vehicle; (v) the vehicle is equipped with a vehicle stability assist system and the control device stopped the vehicle according to an operation of the vehicle stability assist system; and (vi) the parking assist system is temporarily inoperable.

\* \* \* \* \*